US009439209B2

(12) United States Patent
Korhonen et al.

(10) Patent No.: US 9,439,209 B2
(45) Date of Patent: Sep. 6, 2016

(54) SELECTION BETWEEN RANDOM ACCESS AND DEDICATED SCHEDULING REQUEST RESOURCES

(75) Inventors: Juha S. Korhonen, Espoo (FI); Esa Malkamäki, Espoo (FI); Chunli Wu, Bejing (CN)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 14/348,017

(22) PCT Filed: Sep. 30, 2011

(86) PCT No.: PCT/CN2011/080432
§ 371 (c)(1),
(2), (4) Date: Mar. 27, 2014

(87) PCT Pub. No.: WO2013/044497
PCT Pub. Date: Apr. 4, 2013

(65) Prior Publication Data
US 2014/0241302 A1    Aug. 28, 2014

(51) Int. Cl.
*H04W 4/00* (2009.01)
*H04W 72/12* (2009.01)
*H04W 74/02* (2009.01)
*H04W 74/08* (2009.01)

(52) U.S. Cl.
CPC ......... *H04W 72/1278* (2013.01); *H04W 74/02* (2013.01); *H04W 74/0833* (2013.01)

(58) Field of Classification Search
None
See application file for complete search history.

(56) References Cited

U.S. PATENT DOCUMENTS

| 2009/0197610 A1 | 8/2009 | Chun et al. | |
| 2010/0074203 A1* | 3/2010 | Pani | H04W 72/0413 370/329 |
| 2011/0128865 A1* | 6/2011 | Doppler | H04W 76/048 370/252 |

FOREIGN PATENT DOCUMENTS

| CN | 101594666 | 12/2009 |
| CN | 101594690 | 12/2009 |

(Continued)

OTHER PUBLICATIONS

Extended European Search Report received for corresponding European Patent Application No. 11873295.7, dated Mar. 10, 2015, 6 pages.
International Search Report received for corresponding Patent Cooperation Treaty Application No. PCT/CN2011/080432, dated Sep. 30, 2011, 4 pages.
Office action received for corresponding European Patent Application No. 11873295.7, dated Sep. 9, 2015, 4 pages.
Office action received for corresponding European Patent Application No. 11873295.7, dated Nov. 17, 2015, 5 pages.

(Continued)

*Primary Examiner* — Chi H Pham
*Assistant Examiner* — Raul Rivas
(74) *Attorney, Agent, or Firm* — Nokia Technologies Oy

(57) ABSTRACT

In response to determining that a time to a periodic transmission opportunity exceeds a threshold, a UE selects between using a random access procedure and the periodic transmission opportunity to transmit an uplink message. In non-limiting examples given the periodic transmission opportunity is a scheduling request opportunity which is periodic according to an interval configured by a wireless network and the uplink message comprises a scheduling request. In an embodiment the user equipment's determination and selection is conditional on it pre-determining that intended uplink data or control signaling to which the scheduling request relates is delay sensitive. If that pre-determination is that the data/signaling is not delay sensitive then it uses the scheduling request opportunity to send its scheduling request without selecting between the random access procedure and the scheduling request opportunity.

16 Claims, 6 Drawing Sheets

(56) References Cited

FOREIGN PATENT DOCUMENTS

| CN | 101669402 | 3/2010 |
|----|-----------|--------|
| CN | 101795497 A | 8/2010 |
| CN | 101909354 | 8/2010 |
| EP | 2053894 | 4/2009 |
| WO | 2009/038381 A2 | 3/2009 |
| WO | 2011/038768 A1 | 4/2011 |

OTHER PUBLICATIONS

"Triggering of SR in Relation to Allocated Uplink Grants", 3GPP TSG-RAN WG2 #61, R2-081016, Agenda Item: 5.1.1.5, Ericsson, Feb. 11-15, 2008, pp. 1-2.

"SR Triggering in Relation to Uplink Grants", 3GPP TSG-RAN WG2 #61bis, R2-081468, Agenda Item: 5.1.1.5, Ericsson, Mar. 31-Apr. 4, 2008, pp. 1-3.

* cited by examiner

US 9,439,209 B2

SELECTION BETWEEN RANDOM ACCESS AND DEDICATED SCHEDULING REQUEST RESOURCES

RELATED APPLICATION

This application was originally filed as PCT Application No. PCT/CN2011/080432 filed Sep. 30, 2011.

TECHNICAL FIELD

This invention relates generally to signaling in radio networks, and more specifically relates to uplink control signaling of scheduling requests.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
  3GPP third generation partnership project
  BSR buffer status report
  DL downlink (network towards UE)
  eNB EUTRAN Node B (also eNodeB)
  EUTRAN evolved UTRAN (also known as LTE or LTE-A)
  LTE long term evolution
  MME mobility management entity
  PDCCH physical downlink control channel
  PUCCH physical uplink control channel
  PUSCH physical uplink shared channel
  RACH random access channel
  RF radio frequency
  RRC radio resource control
  SR scheduling request
  UE user equipment
  UL uplink (UE towards network)
  UTRAN universal terrestrial radio access network The examples below are in the context of the LTE system. In the LTE cellular radio system the base station (termed an eNodeB or eNB in LTE) signals on the physical downlink control channel PDCCH the time-frequency resources (physical resource blocks) that lie on the physical downlink shared channel PDSCH and the physical uplink shared channel PUSCH and which are allocated to a mobile terminal (UE). This scheduling protocol allows advanced multi-antenna techniques like precoded transmission and multiple-input/multiple-output operation for the downlink shared data channel. For the case in which a UE has UL data to send, it will send a scheduling request SR to the eNB in order to obtain an UL grant for a PUSCH resource allocation.

There are two different ways in LTE by which a UE can send a SR. If the UE is not in a RRC connected state with the eNB it will use a random access procedure in order to acquire timing synchronization and a temporary identifier for use in the cell as well as the PUSCH allocation it seeks. If the UE is in a RRC connected state with the eNB it can use either random access procedure or periodic SR resources. If periodic SR resources are configured, UE will use one or more of the periodic SR resources on the PUCCH which are dedicated for that particular UE. For any given UE each of these dedicated SR resources may be considered a SR opportunity for that same UE. The transition from blocks 112 to 114 at FIG. 1 below gives an exception by which a UE in the RRC connected state is allowed to use the random access procedure, but only under specific conditions detailed there. If the UE in a connected mode also does not have PUCCH resources then the UE can also use the random access procedure according to the direct transition from block 104 to 114.

The interval of the UE's SR opportunities on the PUCCH is semi-statically fixed between 1 and 80 ms (milliseconds). FIG. 1A illustrates the concept; the UE is configured with a SR cycle which gives the interval between SR opportunities. Shorter intervals and thus more frequent opportunities are configured for UEs with delay critical services, while longer intervals were originally specified in order to allow conserving the PUCCH resources when the network is keeping a large number of UEs with relatively low activity levels in the RRC connected state. There has been some discussions that LTE (or LTE-Advanced which is to be implemented as LTE Release 10) allow even longer SR intervals than is presently specified to more efficiently handle smartphone background traffic. Longer intervals between SR opportunities translate to longer delays when the UE needs to obtaining PUSCH resources for delay critical signaling or data.

Consider a specific example of a UE configured with an 80 ms SR interval. If we assume its signaling need arises immediately after a SR opportunity expires, that UE will first have to wait 80 ms for the first SR opportunity and another 80 ms for each retransmission of its SR if the UE does not receive PUSCH resources because eNB fails to receive the UE's PUCCH transmission or does not have resources to allocate for the UE. In LTE the maximum number of SR transmissions (given by the RRC parameter dsr-TransMax) can be set no lower than four, which means that in the worst case the UE will delay 320 ms, plus a configurable time for waiting the PUSCH grant after the last SR attempt, before it will abandon this attempt to obtain a PUSCH and begin a new attempt. This is a very large latency, particularly for a UE in the RRC connected state. As a point of comparison, LTE requires a maximum of 100 ms latency for a UE not in the RRC connected mode to transition from idle (not RRC connected) to active (RRC connected) states, and 50 ms latency for a UE in the RRC connected mode to transition from dormant to active. Extending the SR interval further would result in the above worst case delay extending latency for transmitting a packet even further.

SUMMARY

In a first exemplary aspect of the invention there is an apparatus which includes at least one processor and at least one memory including computer program code. The at least one memory and the computer program code are configured, with the at least one processor, to cause the apparatus to at least: determine that a time to a periodic transmission opportunity exceeds a threshold; and in response to the determining, to select between using a random access procedure and the periodic transmission opportunity to transmit an uplink message.

In a second exemplary aspect of the invention there is a method comprising: determining that a time to a periodic transmission opportunity exceeds a threshold; and in response to the determining, selecting between using a random access procedure and the periodic transmission opportunity to transmit an uplink message.

In a third exemplary aspect of the invention there is a tangible computer-readable medium bearing computer program code embodied therein for use with a computer. In this aspect the computer program code comprises: code for determining that a time to a periodic transmission opportunity exceeds a threshold; and code for, in response to the determining, selecting between using a random access procedure and the periodic transmission opportunity to transmit an uplink message.

These and other aspects of the invention are detailed with particularity below.

DETAILED DESCRIPTION

Figure 1A:
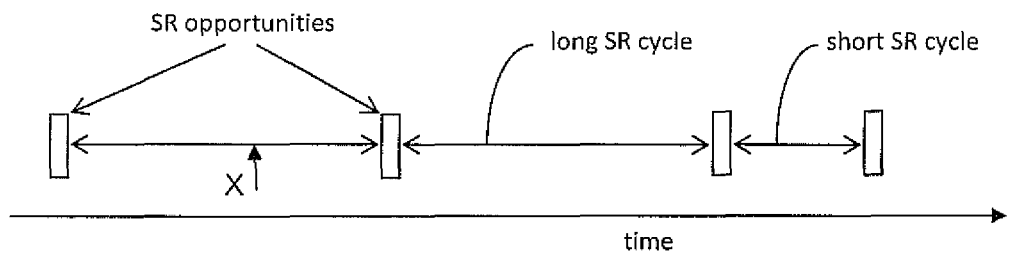
FIG. 1A is a timing diagram illustrating two cycles of scheduling request opportunities with which a UE might be configured.
Figure 1B:
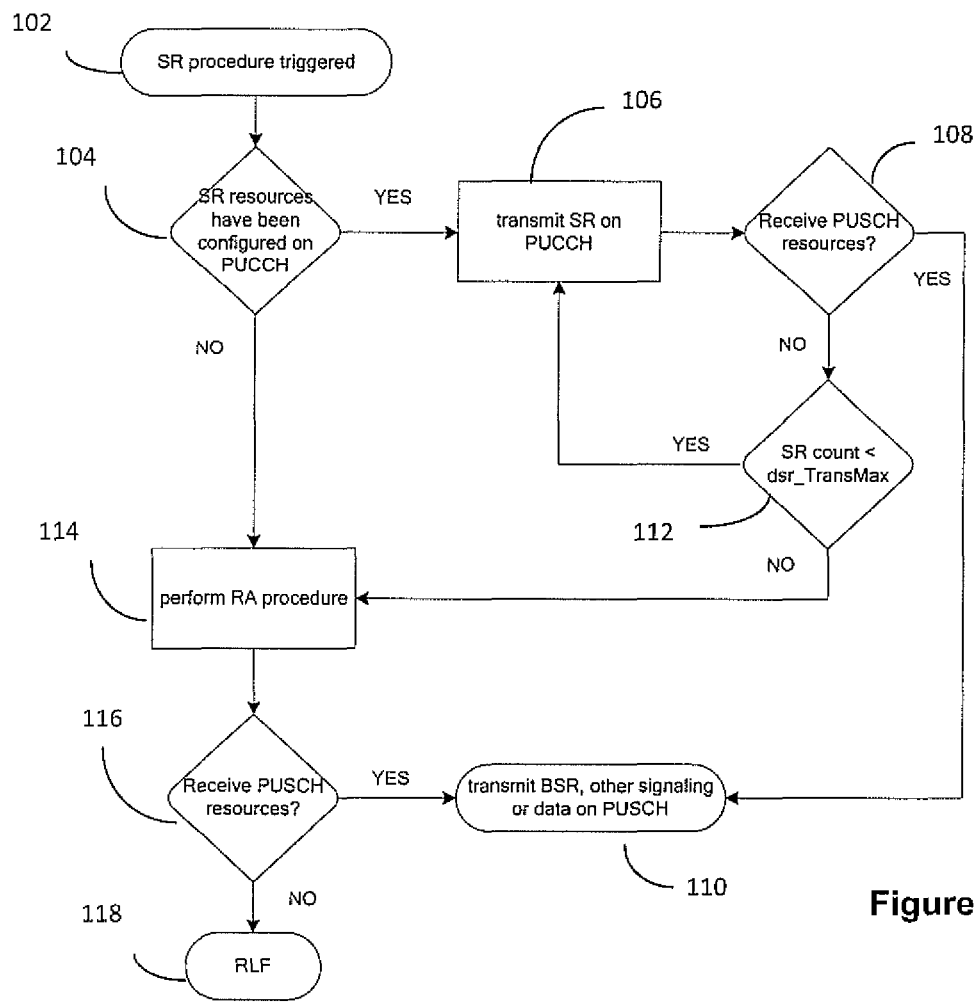
FIG. 1B is a flow diagram summarizing processes a UE might follow in conventional LTE for obtaining a PUSCH resource on which to transmit its scheduling request.

FIG. 1B is a flow chart illustrating the procedures a UE would follow in a conventional LTE system (specifically, Releases 8/9/10) to obtain a PUSCH resource on which to send data and/or its BSR (buffer status report). At block 102 it recognizes a need to send data or control signaling and so it will first need to send its SR. If the UE is in a RRC connected state then it may have been configured with a SR cycle, in which case the SR resources may have already been configured on the PUCCH as in block 104 and the UE simply transmits its SR at block 106 on the PUCCH at the next SR opportunity according to its SR cycle. At block 108 the UE will then receive a PDCCH which allocates to it some PUSCH resource(s) on which the UE can then transmit its data or control signaling at block 110.

If the UE does not receive an allocation for a PUSCH at block 108 (for example, it does not receive from the network a PUSCH allocation which in effect is the same as the UE receiving an explicit negative acknowledgment to its SR transmission of block 106), then the UE tracks the number of re-transmissions it has made of this SR and compares against the network-configured maximum given by the parameter dsr_Transmax. So long as that maximum number of re-transmissions is not yet exceeded the UE will re-send at block 106 that same SR on its next SR opportunity according to its SR cycle, until either it receives the requested PUSCH resources or the maximum is exceeded. If the maximum number of re-transmissions at block 112 is exceeded, the UE can then perform a random access RA procedure at block 114.

If the UE is at block 104 and there are no configured SR resources for it, in that case also the UE can begin a random access procedure at block 114. From this procedure the UE can also obtain an allocation of PUSCH resources at block 116, after which it can finally transmit a buffer status report BSR possibly together with some data on the PUSCH at block 110. If after the random access procedure, which itself provides re-transmission and timing back-off options in case transmissions from multiple UE's collide on the RACH, the UE still does not receive a PUSCH resource at block 116, then the UE concludes at block 118 that there is radio link failure RLF.

If the network fails to receive the first SR on the PUCCH at block 106, it is likely that also the retransmissions will fail because unlike the re-transmissions in the random access procedure there is no power ramp-up for these SR re-transmissions. In that regard the random access procedure is more reliable than a re-transmission at a next SR opportunity because preambles on the RACH are sent with increasing power.

As noted in the background section above, there is a desire to allow for a SR interval longer than 80 ms to accommodate more UEs in the RRC connected mode, such as smartphones with background updates, while saving on PUCCH resources. This will also serve the growing need for machine-type communications (direct machine to machine M2M communications, without human involvement). Longer SR intervals will also enable a larger number of UEs to be in a RRC connected state in a given cell. But the present UE's SR procedure does not adapt according to the delay requirement of the PUSCH resource request. This means that in order to avoid unacceptable latency for UE originated signaling, the network cannot configure UEs with long intervals of dedicated SR resources.

With these considerations in mind, what is needed is a way to limit the latency if a UE needs to send latency sensitive data or signaling while still enabling a long SR interval. Exemplary embodiments of these teachings serve those dual purposes by having the UE make a determination early on whether to use the already-configured PUCCH at its SR opportunity or to use the RACH procedure to obtain a PUSCH resource. This differs from FIG. 1B in that a) the UE in the idle (not RRC connected) state makes no decision since its only option at block 104 is for the random access procedure at block 114; and b) the UE in the RRC connected state and having a periodic SR resource configured on the PUCCH also makes no decision at block 104 since the LTE specifications require that it can utilize the random access procedure at block 114 only after the maximum number of SR re-transmissions have still failed to procure for it a PUSCH. Simply said, if the UE is configured with dedicated SR resources on the PUCCH, conventional LTE requires that it first has to at least attempt to use those resources.

So for example a UE configured with a long SR interval on the PUCCH which also have a delay critical need of a PUSCH resource (for example, signaling on the signaling radio bearer) can choose to utilize the RACH procedure to get their PUSCH allocation and forego using the SR opportunities. If the SR is being invoked to send data on signaling radio bearers (or at least the most critical of them), the UE can decide to start a random access procedure if the separation to the next dedicated SR opportunity is larger than a fixed threshold time, or if the SR interval is larger than a threshold. In one embodiment the network will signal to the UE a list of radio bearers (or logical channels) for which the direct use of RACH is allowed, and also the network may signal the threshold time or SR interval threshold. The UE is then empowered to decide, at least for those bearers/logical channels, whether it wants to use a SR opportunity or a random access procedure to obtain its PUSCH resource.

To make this decision there may be implementing software stored in a memory of the UE which applies a selection rule that makes the decision based on standardized or network signaled parameters that define the radio bearers or logical channels to which the selection rule applies and how long a time the UE is allowed to wait for the next regular SR opportunity rather than using the random access procedure.

Certain such implementations do not require any additional signaling to or from the network but only a change to the governing wireless network specifications. For example, such adapted specifications may stipulate that if the cause of the SR is send UL data on signaling radio bearers, or on certain signaling radio bearers, the UE may initiate a random access procedure based on the time to a SR opportunity exceeding some threshold. The time may be from the present time (for example, time X at FIG. 1) to the next SR opportunity or it may be the time between configured SR opportunities (the full SR interval). The threshold may be fixed or it may be dynamic based on the UE's assessment of how long it will take it to obtain a PUSCH using the random access procedure, and/or based on the time criticality of the signaling it needs to send.

Other embodiments will require some network signaling to implement. For example, in one such embodiment the network will signal to the UE a list of radio bearers or logical channels for which it is allowed to obtain a PUSCH resource via direct use of the random access procedure, and/or the threshold time, and/or the SR interval threshold.

Figure 2:
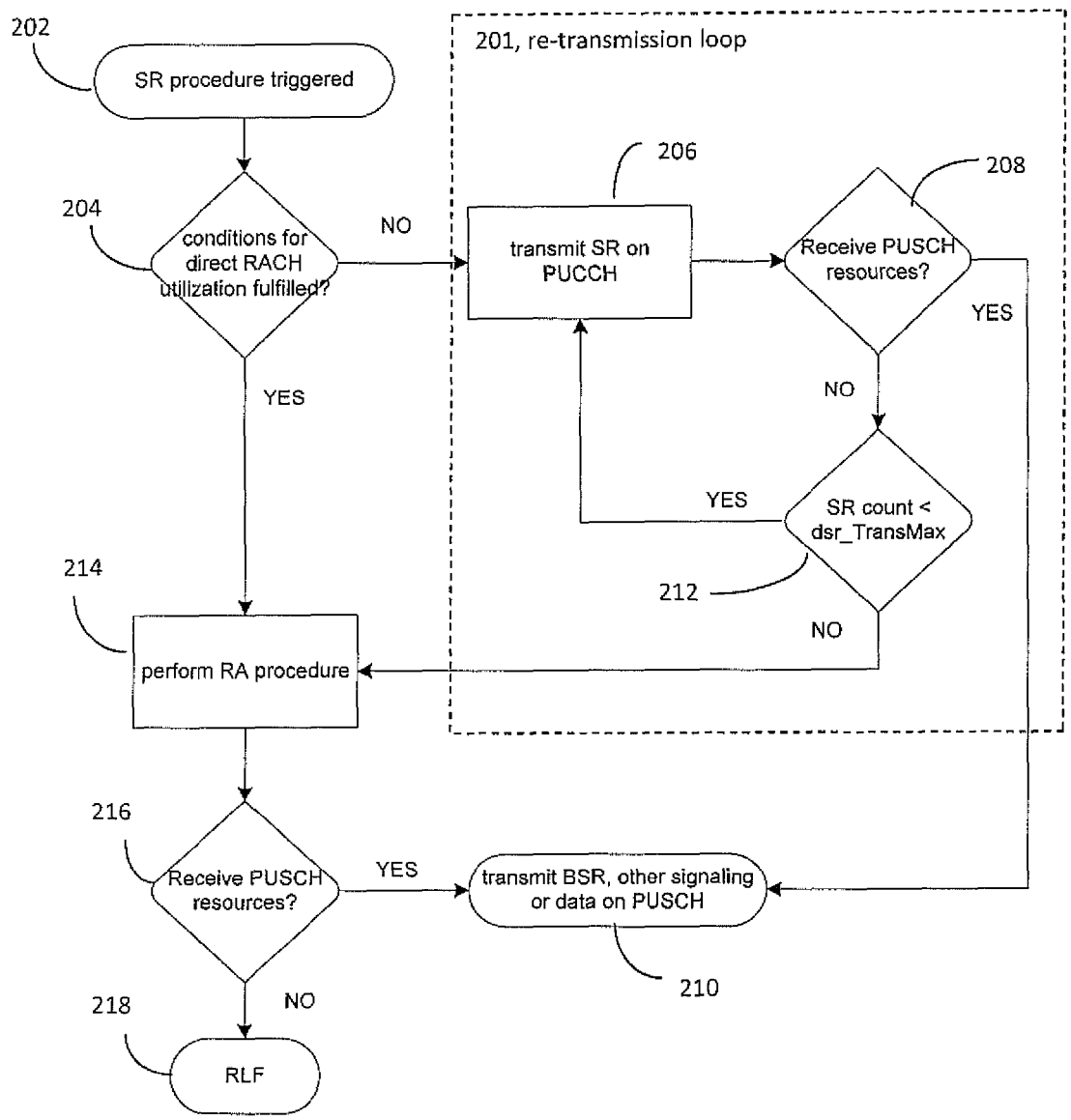
FIGS. 2 and 3A, and 3B are flow diagrams each illustrating procedures for a user equipment to follow to select whether to use a dedicated resource or a random access procedure to obtain an uplink resource on which to send data and/or a buffer status report (BSR), according to various embodiments of these teachings.
Figure 3A:
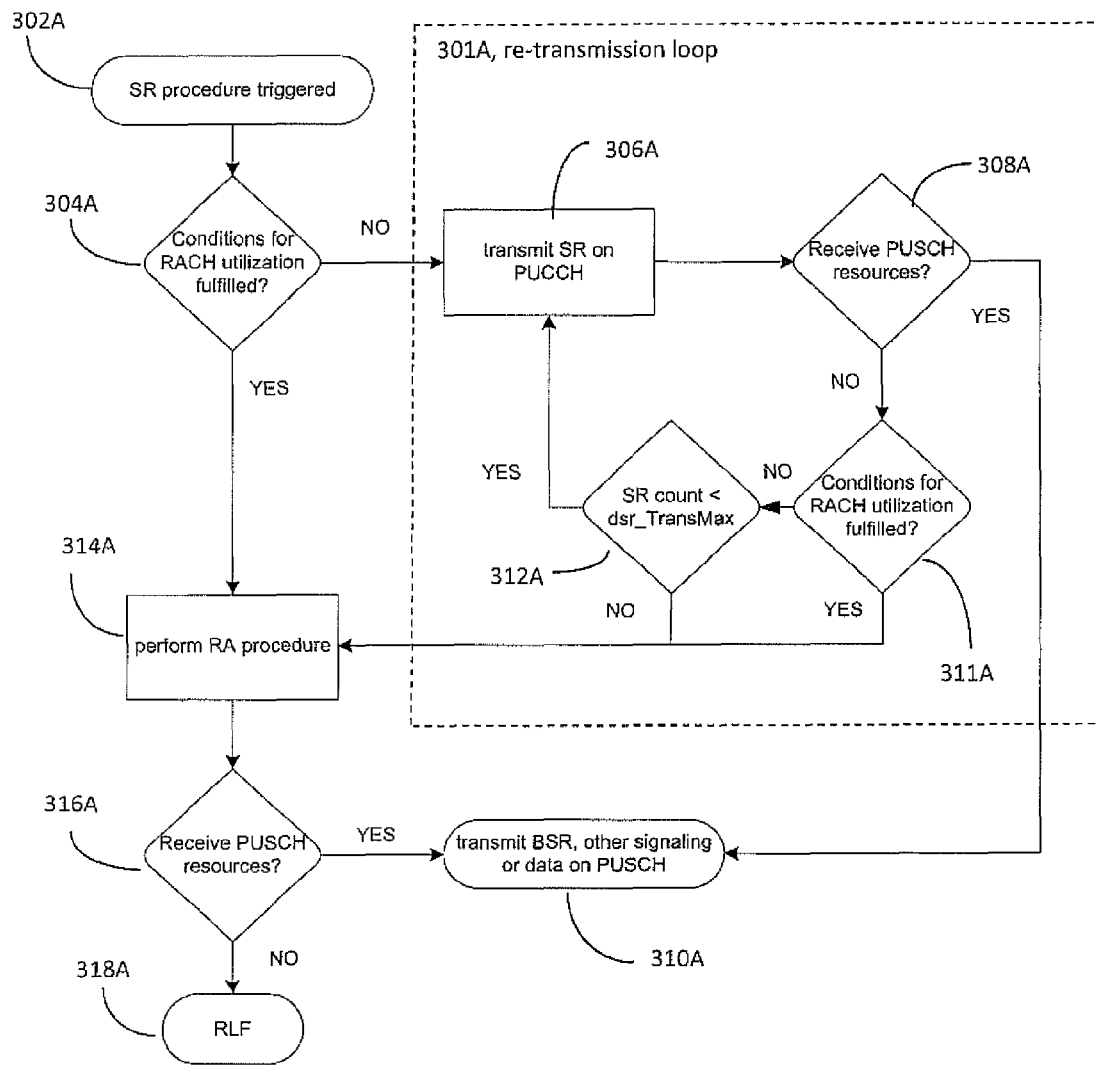
Figure 3B:
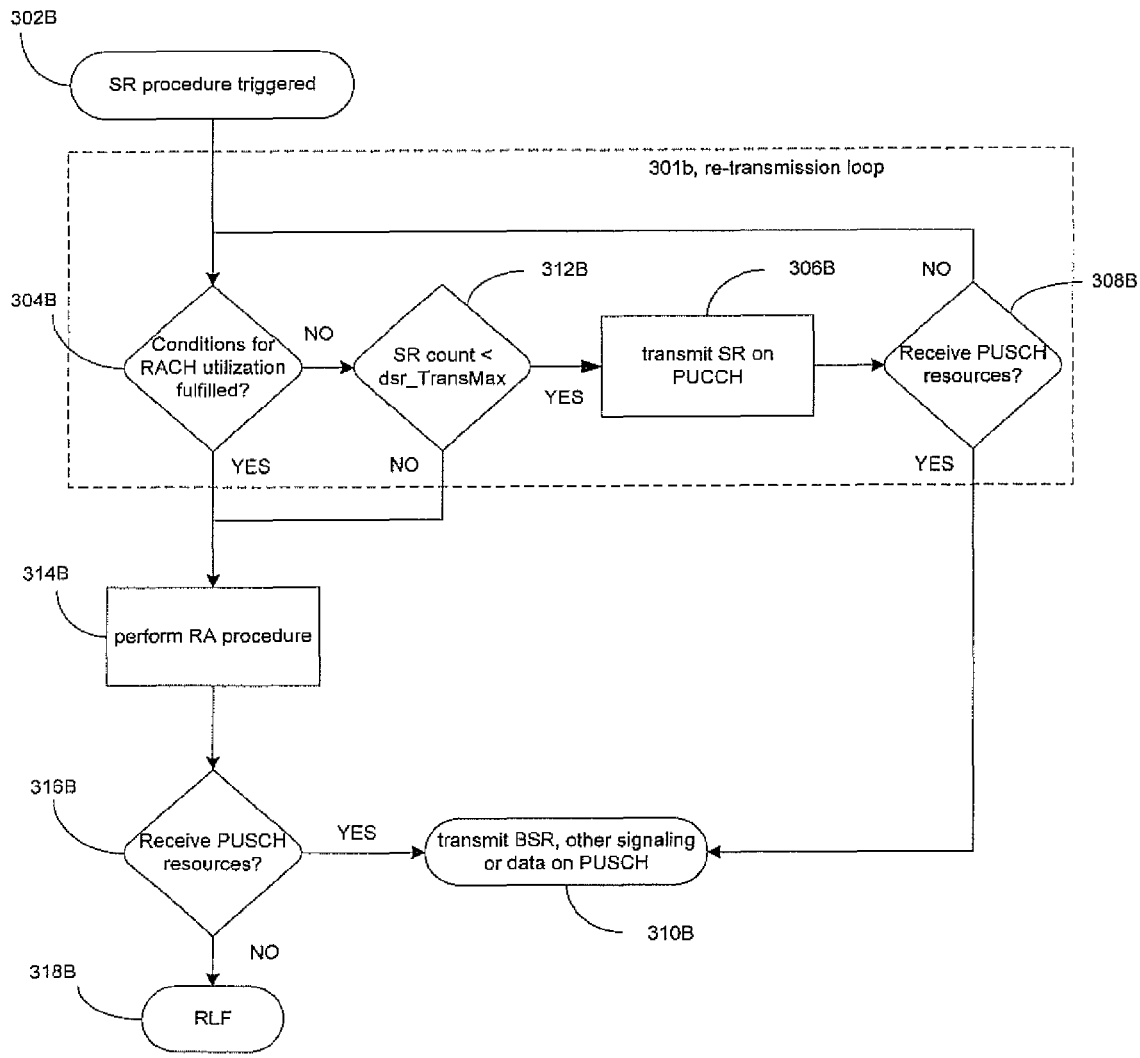

Three specific embodiments are shown at FIGS. 2 and 3A and 3B which are flow charts illustrating from the UE's perspective how it might implement the decision whether to use a SR opportunity or a random access procedure to get a PUSCH allocated. One principal difference between FIG. 2 and FIGS. 3A/B is that in FIG. 2 the decision whether to use dedicated resources or the random access procedure is made only once during the whole flow chart, whereas in FIGS. 3A/B the UE has more flexibility in that there is a second decision point in case the UE's first attempt using the dedicated resource in the SR opportunity fails. In all FIGS. 2, 3A and 3B the UE begins in an RRC connected state since it has dedicated PUCCH at each of its SR opportunities.

First consider FIG. 2. At block 202 it recognizes a need to send data or control signaling and so it has a need to send a SR. At block 204 the UE checks its selection rule to see if the conditions for utilizing the RACH directly are satisfied. As in the above examples, those conditions may be the time until the next SR opportunity or the length of the SR interval exceeding a fixed threshold given by the network, as non-limiting examples. If the conditions at block 204 are not satisfied then the UE will decide to utilize its next available SR opportunity and transmit its SR there at block 206 on the corresponding dedicated PUCCH resource. Normal progression then has the UE receiving a PDCCH which allocates to it at block 208 some PUSCH resource(s) on which the UE can then transmit its data or control signaling at block 210.

The re-transmission loop 201 of FIG. 2 is similar to that described for FIG. 1. If the UE does not receive an allocation for a PUSCH at block 208, the UE tracks the number of re-transmissions it has made of this SR and at block 212 compares against the network-configured maximum given by the parameter dsr_Transmax. So long as that maximum number of re-transmissions is not yet exceeded the UE will re-send at block 206 that same SR on its next SR opportunity, and this process repeats until the UE receives the requested PUSCH resources or the maximum is exceeded. If the maximum number of re-transmissions at block 212 is exceeded, the UE can then perform a random access RA procedure at block 214 similar to that shown for FIG. 1.

If the conditions for utilizing the RACH directly are satisfied then the UE will decide at block 204 to utilize a random access procedure which it initiates at block 214. From this procedure the UE will obtain an allocation of PUSCH resources at block 216, after which it can finally transmit data and/or a buffer status report BSR on the PUSCH at block 210. If after the random access procedure, including the re-transmission attempts included within that procedure, the UE still does not receive a PUSCH resource at block 216 then the UE concludes at block 218 that there is radio link failure RLF.

Now consider FIG. 3A. Blocks 302A, 304A, 310A, 314A, 316A and 318A are similar to respective blocks 202, 204, 210, 214, 216 and 218 of FIG. 2 and will not be detailed further. One salient difference over FIG. 2 lies within the re-transmission loop 301A of FIG. 3A. When the UE has decided to utilize its next available SR opportunity and transmit its SR on the dedicated PUSCH resource at block 306A, as with FIG. 2 it will check at block 308A whether it has been allocated a PUSCH resource for the data or other signaling the UE wishes to send. In the case that the UE does not receive that PUSCH at block 308A, there is another decision at block 311A whether to continue with SR re-transmissions on the dedicated resources corresponding to the SR opportunities or to suspend those re-transmissions in favor of the RACH procedure. A new timer may be needed for performing block 308A. The timer would be started when dedicated SR is sent and it determines how long UE should wait for PUSCH allocation before going for RACH procedure. The timer could be configured by the network.

As a concrete example of the procedure of FIG. 3A, let us assume that UE needs resources for a signaling radio bearer and the threshold time to wait for the next dedicated SR opportunity has been set to 20 ms for this bearer. Further, let us assume that the UE has dedicated SR resources with intervals of 80 ms. Then the UE would decide (in block 304A) to utilize a dedicated SR resource if such a resource were available within 20 ms. If transmission on this dedicated SR resource (in block 306A) did not lead to PUSCH allocation, the UE would continue with the random access procedure (block 314A) because the next periodic SR resource would be available later than after 20 ms, as observed in block 308A. (It can be assumed that waiting for PUSCH allocation after sending a SR would be typically on the order of 10 ms.)

The decision logic at block 311A may be identical to that employed at block 304A (as assumed in the example above) or it may differ somewhat. Since some non-negligible latency has already been imposed by the time the UE arrives at the decision of block 311A, and unlike the RACH procedure the re-transmissions on the dedicated resources at block 306A will not use progressively higher transmit powers, in certain non-limiting embodiments the decision logic at block 311A is biased toward the RACH procedure as compared to the decision logic at block 304A. The bias may be increased with every unsuccessful transmission on dedicated SR resources.

The remainder of FIG. 3A is not unlike FIG. 2 so long as the decision from block 311A is that the conditions for RACH utilization are not met. In that case the UE will at block 312A compare the number of re-transmissions it has made of this SR against the network-configured maximum given by the parameter dsr_Transmax. If block 312A shows that the maximum number is not yet exceeded the UE will continue at block 306A with SR re-transmissions on the dedicated SR resources, or if the maximum number is exceeded then like FIG. 2 the UE will transition to the RACH procedure which it initiates at block 314A.

If instead the decision from block 311A is that the conditions for RACH utilization are met then the UE will transition at that time to block 314A where it initiates a random access procedure.

FIG. 3B is an alternative presentation of the flow of FIG. 3A. All the blocks 302B-318B are similar to the corresponding blocks 302A-318A in FIG. 3A. One important difference between FIGS. 3A and 3B is that FIG. 3A emphasizes the difference between the first and possible later decision on transitions to RACH use (blocks 304A and 311A) although the decision function in block 304B may as well take into account how many opportunities on dedicated SR resources had been used when block 304B is entered.

For either of the FIG. 2 or FIGS. 3A/B embodiments, the decision at blocks 204, 304A, 304B and 311A may be specific to a given signalling or data radio bearer. For example, the network may configure the decision criteria such that there is a maximum allowable latency for each bearer and that latency may be different for different bearers and the UE would use the periodic dedicated SR resource as long as the latency threshold is not exceeded for that bearer. In this manner some bearers would result in the UE selecting the random access option earlier as compared to other bearers.

In conventional LTE specifications for Release 8/9/10, when the eNB receives in the random access procedure the UL transmission on the PUSCH resource, that was granted in the RACH preamble response, from the UE that had previously been configured with dedicated SR resources (termed Message 3, which is the transmission at block 110 following block 116 in FIG. 1), the network assumes that the UE has released the dedicated PUCCH and SR resources. But, when these teachings are implemented and the UE selects between the dedicated SR resource and the random access procedure, there also should be some common understanding among the eNB and the UE whether the dedicated resources for that UE are to be retained or discontinued.

According to one embodiment of these teachings, if the UE sends its SR using the random access procedure it always releases the PUCCH and SR resources. In this case the network would then need to reconfigure the PUCCH and SR resources for that same UE. At least in some cases that would require additional signaling, though not in all cases is this additive because reconfiguring the resources might be needed anyway if the reason for the SR transmission is to move the UE to a more active state.

According to another embodiment the UE indicates whether it is using RACH directly or if using the FIG. 3A or 3B embodiments it also indicates whether the RACH was used after failed transmissions on the dedicated SR resources. One way for the UE to perform this signaling is to partition the RACH preamble signatures: for example the UE will select an odd preamble index to signal that the UE has reached the "SR count=dsr_TransMax" condition and an even preamble sequence to indicate the UE went directly to the RACH procedure without attempting any SR transmissions on a dedicated resource. Another example for this signaling is for the UE to add in the RACH Message 3 an information element that indicates whether the UE had reached the "SR count=dsr_TransMax" condition and released its PUCCH and SR resources, or the resources are kept. In one implementation this information element indicates that the random access procedure was used for gaining faster access to a PUSCH for selected a particular (higher priority) data or signaling radio bearer.

The above examples are in the context of the LTE system but those are non-limiting to the broader teachings, which may be applied to any wireless radio access technology such as UTRAN, CDMA and others which have a random access procedure by which a UE can get an uplink resource. In that regard the terminology used in the above examples for channels, messages, and parameters are not limiting to these teachings but exemplary of specific implementations in an LTE system.

Implementing the above teachings result in the following technical effects to one extent or another, depending on the specific implementation. First, adopting these teachings enable the network to utilize long SR periods, which saves PUCCH resources such as for smartphones in a connected state which are only getting/sending background data (such as for example emails and updates to UE position and messages posted on social networking sites) but are otherwise not active. While these teachings will increase the load on the RACH they will simultaneously reduce the load on the dedicated PUCCHs, and since the delay critical data for which SR might be sent on the RACH occur very seldom, on balance these teachings lead to an increase in the efficiency of how radio resources are used.

Additionally, using a long SR period for background traffic is better enabled for the network, and in some implementations can use a best effort radio bearer whereas any signaling traffic should not be delayed. So certain embodiments of these teachings allow efficient PUCCH usage for background traffic but at the same time allows low latency for signaling and other delay critical traffic. All of these advantages more than offset the added complexity to the SR procedures that is inherent in the decision(s) as detailed above.

Figure 4:
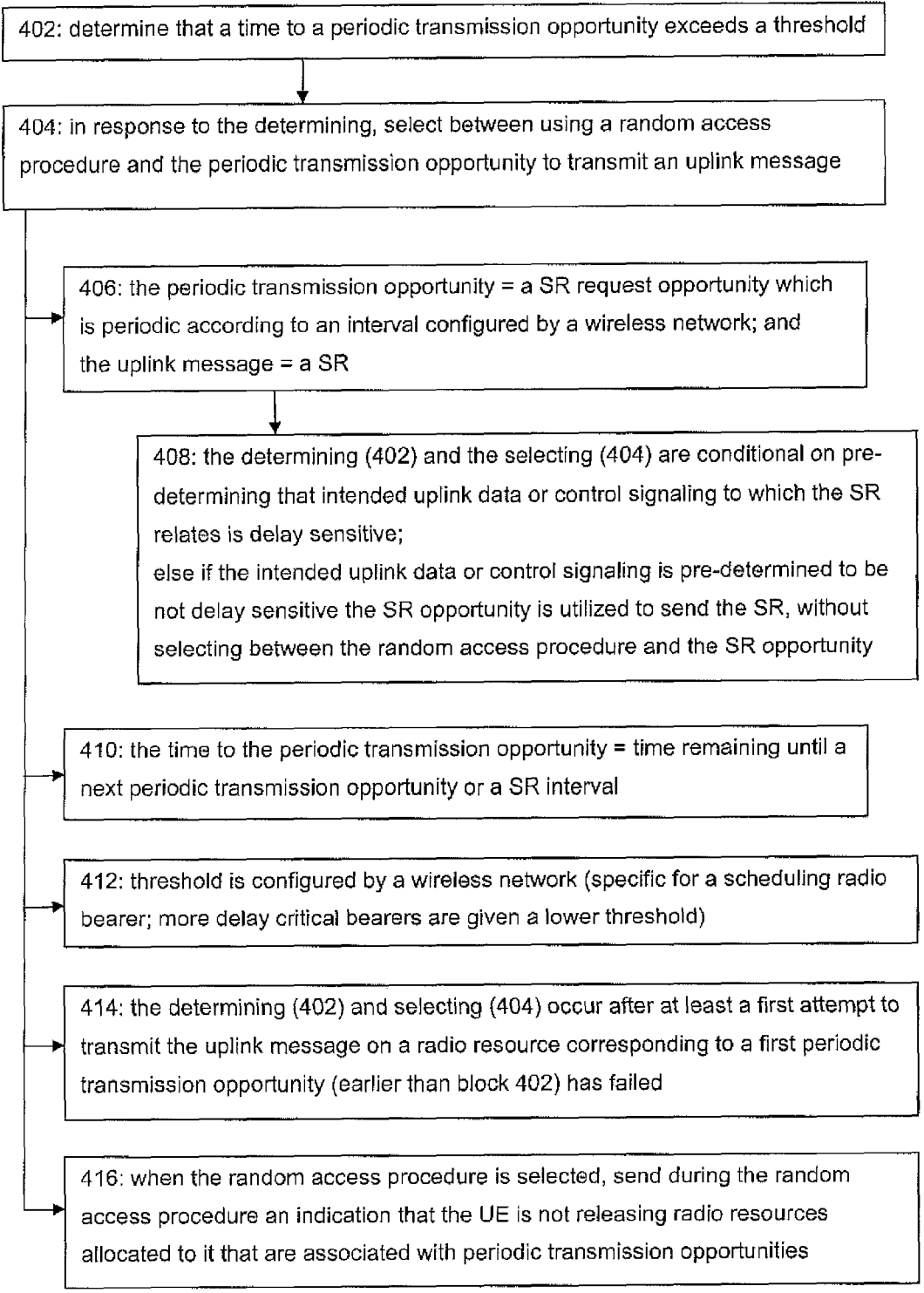
FIG. 4 is a flow diagram illustrating a method, and actions taken by an apparatus, and the result of executing an embodied computer program from the perspective of the user equipment, according to the exemplary embodiments of the these teachings.

FIG. 4 is a flow diagram illustrating for various of the above embodiments those actions taken by the UE, or by one or more components thereof. Blocks 402 and 404 are more generic to the various examples above and remaining portions of FIG. 4 details various ones of the more specific embodiments and implementations. At block 402 the UE determines that a time to a periodic transmission opportunity exceeds a threshold. Then at block 404 and automatically in response to the determining at block 402, the UE selects between using a random access procedure and the periodic transmission opportunity to transmit an uplink message.

Block 406 gives detail corresponding to the examples above: the periodic transmission opportunity comprises a scheduling request opportunity which is periodic according to an interval configured by a wireless network; and the uplink message comprises a scheduling request SR. Note that in conventional LTE the dedicated SR is minimal, a given sequence that the UE sends on the dedicated PUCCH. Thus this UL message scheduling request may be a single bit indicating the UE wants PUSCH resource(s) since the UE indicates it does not want resources by not transmitting on its dedicated PUCCH.

Block 408 follows from block 406 and gives the embodiment in which the UE uses the decision logic sparingly, only when the underlying/intended UL data transmission or control signaling to which the SR relates is delay sensitive. Block 408 summarizes this as the determining of block 402 and the selecting of block 404 are conditional on pre-determining that intended uplink signaling (data or control signaling) to which the SR relates is delay sensitive; else for the case the intended uplink signaling is pre-determined to be not delay sensitive the scheduling request opportunity is utilized to send the SR, without selecting between the random access procedure and the scheduling request opportunity.

Block 410 summarizes the two different ways for the UE to compute the latency in using the periodic transmission opportunity which it uses for the determining at block 402. Specifically, in one embodiment the time to the periodic transmission opportunity is a time remaining until a next periodic transmission opportunity, and in another embodiment it is the full scheduling request interval which is configured by a wireless network.

Block 412 specifies that the threshold of block 402 may in some embodiments be configured by the wireless network, and in more particular embodiments that network-configured threshold may be radio bearer specific such that a lower threshold is applied for a more delay critical bearer.

Recall from above that FIGS. 3A and 3B provided further decision points for the UE to select between utilizing the random access procedure and the SR transmission opportunity. A second decision point is summarized at block 414. If we consider the periodic transmission opportunity stated at block 402 as a second periodic transmission opportunity, then the determining at block 402 and the selecting of block 404 occur after at least a first attempt to transmit the uplink message on a radio resource corresponding to a first periodic transmission opportunity has failed (the first periodic transmission opportunity being previous in time to the second).

And finally at block 416 of FIG. 4 is one of the several embodiments which aid in coordinating between the UE and the network some common understanding after the UE selects the random access procedure for sending its SR. In this case the random access procedure is selected, and during that random access procedure there is sent to the wireless network an indication that the UE is not releasing radio resources allocated to it that are associated with periodic transmission opportunities. In this embodiment the default behavior, that the UE does release those resources, is not signaled. In alternate embodiment the opposite convention may be employed in which the UE does signal that it is releasing those resources and the default behavior that is not specifically signaled is that the UE is not releasing those resources.

The various embodiments of these teachings as detailed at FIG. 4 and in the examples above may be implemented in tangibly embodied software (such as a computer-readable medium bearing computer program code embodied therein for use with a computer, in which the computer program code has code for accomplishing some or all of the actions set forth at FIG. 4, hardware, application logic/algorithms or a combination of software, hardware and application logic. In an exemplary embodiment, the application logic, algorithm(s), software or an instruction set is maintained on any one of various conventional computer-readable media. The method represented by FIG. 4 may be performed via hardware elements, via tangibly embodied software executing on a processor, or via combination of both. A program of computer-readable instructions may be embodied on a computer readable memory such as for example any of the MEMs detailed below with respect to FIG. 5.

Figure 5:
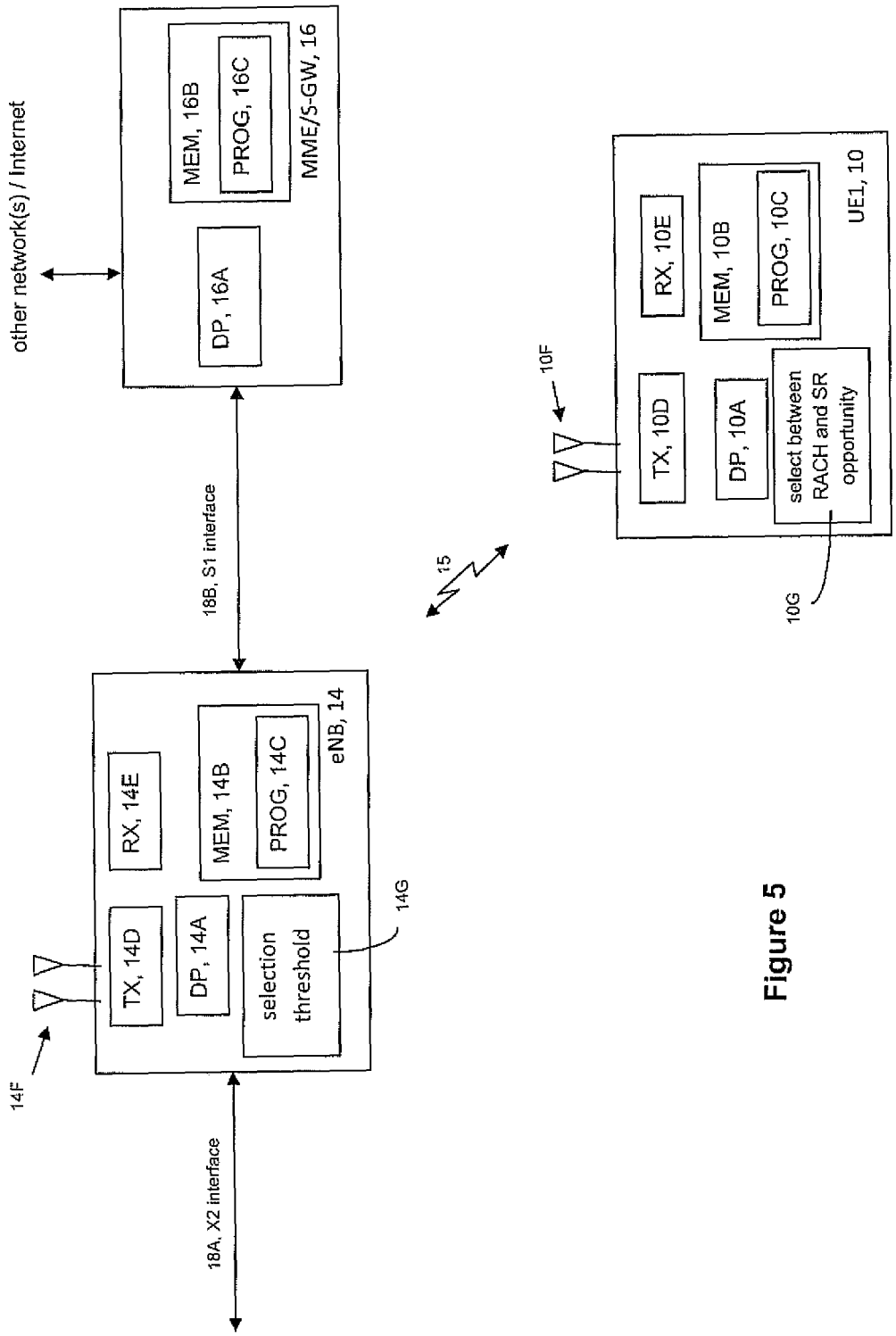
FIG. 5 is a schematic block diagram showing various electronic devices/apparatus suitable for implementing exemplary embodiments of these teachings detailed herein.

Reference is now made to FIG. 5 for illustrating a simplified block diagram of various electronic devices and apparatus that are suitable for use in practicing the exemplary embodiments of this invention. In FIG. 5, a wireless network is adapted for communication over a wireless link 15 with an apparatus, such as a mobile communication device which is referred to above as a UE 10, via a network access node designated by example at FIG. 5 as an eNB 14 for the case of an LTE or LTE-A network. There is further an X2 interface ISA between the eNB 14 and other similar network access nodes. The wireless network may include a network control element 16 that may be a mobility management entity (MME) having serving gateway (S-GW) functionality such as that known in the LTE system, and which provides connectivity with a further network such as a publicly switched telephone network and/or a data communications network (e.g., the Internet).

The UE 10 includes a controller, such as a computer or a data processor (DP) 10A, a computer-readable memory (MEM) 10B that tangibly stores a program of computer instructions (PROG) 10C, and at least one suitable radio frequency (RF) transmitter 10D and receiver 10E for bidirectional wireless communications with the eNB 14 via one or more antennas 10F. The UE 10 has functionality shown at functional unit 10G to select between utilizing a random access procedure and a SR opportunity for sending an uplink message/SR as detailed with particularity above.

The eNB 14 also includes a controller, such as a computer or a data processor (DP) 14A, a computer-readable memory (MEM) 14B that tangibly stores a program of computer instructions (PROG) 14C, and at least one suitable RF transmitter 14D and receiver 14E for communication with the UE 10 via one or more antennas 14F. The eNB 14 has functionality at functional unit 14G for providing the UE with at least the threshold which the UE uses in its selection logic according to various of the teachings above. In other examples above this threshold is bearer-specific. The eNB 14 is additionally coupled via a data/control path 18B (shown as an S1 interface) to the MME/S-GW 16.

The MME/S-GW 16 also includes a controller, such as a computer or a data processor (DP) 16A and a computer-readable memory (MEM) 168 that stores a program of computer instructions (PROG) 16C. The MME/S-GW 16 may be connected to additional networks such as the Internet.

The techniques herein may be considered as being implemented solely as computer program code embodied in a memory resident within the UE 10 or within the eNB 14 (e.g., as PROG 10C or 14C, respectively), or as a combination of embodied computer program code (executed by one or more processors) and various hardware, including memory locations, data processors, buffers, interfaces and the like, or entirely in hardware (such as in an integrated circuit). Additionally, the transmitters and receivers 10D/E and 14D/E may also be implemented using any type of wireless communications interface suitable to the local technical environment, for example, they may be implemented using individual transmitters, receivers, transceivers or a combination of such components.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 14B may be any type of computer-readable medium bearing computer program code that is suitable to the local technical environment and may be implemented using any suitable data storage technology, such as semiconductor based memory devices, flash memory, magnetic memory devices and systems, optical memory devices and systems, fixed memory and removable memory. The DPs 10A and 14A may be of any type suitable to the local technical environment, and may include one or more of general purpose computers, special purpose computers, microprocessors, digital signal processors (DSPs) and processors based on a multi-core processor architecture, as non-limiting examples.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   at least one processor; and
   at least one memory including computer program code,
   in which the at least one memory and the computer program code are configured, with the at least one processor, to cause the apparatus at least to:
   determine that a time to a periodic transmission opportunity exceeds a threshold; and
   in response to the determining, select between using a random access procedure and the periodic transmission opportunity to transmit an uplink message,
   in which the threshold is configured by a wireless network and the threshold is radio bearer specific.

2. The apparatus according to claim 1, in which:
   the periodic transmission opportunity comprises a scheduling request opportunity which is periodic according to an interval configured by the wireless network; and
   the uplink message comprises a scheduling request.

3. The apparatus according to claim 2, in which the at least one memory and the computer program code are configured with the at least one processor to cause the apparatus to determine and to select as said conditional on the apparatus pre-determining that intended uplink data or control signaling to which the scheduling request relates is delay sensitive; else for the case the apparatus pre-determines that the intended uplink data or control signaling is not delay sensitive the apparatus is configured to utilize the scheduling request opportunity to send the scheduling request without selecting between the random access procedure and the scheduling request opportunity.

4. The apparatus according to claim 1, in which the time to the periodic transmission opportunity is a time remaining until a next periodic transmission opportunity.

5. The apparatus according to claim 1, in which the time to the periodic transmission opportunity is a scheduling request interval configured by the wireless network.

6. The apparatus according to claim 1, in which the periodic transmission opportunity comprises a second periodic transmission opportunity, and the at least one memory and the computer program code are configured with the at least one processor to cause the apparatus to determine and select as said after at least a first attempt to transmit the uplink message on a radio resource corresponding to a previous first periodic transmission opportunity has failed.

7. The apparatus according to claim 1, in which the apparatus comprises a user equipment and the at least one memory and the computer program code are configured with the at least one processor to cause the user equipment at least further to:
   for the case in which the random access procedure is selected, send to the wireless network during the random access procedure an indication that the user equipment is not releasing radio resources allocated to the user equipment that are associated with periodic transmission opportunities.

8. A method comprising:
   determining that a time to a periodic transmission opportunity exceeds a threshold; and
   in response to the determining, selecting between using a random access procedure and the periodic transmission opportunity to transmit an uplink message,
   in which the threshold is configured by a wireless network and the threshold is radio bearer specific.

9. The method according to claim 8, in which:
   the periodic transmission opportunity comprises a scheduling request opportunity which is periodic according to an interval configured by the wireless network; and
   the uplink message comprises a scheduling request.

10. The method according to claim 9, in which the determining and the selecting are conditional on pre-determining that intended uplink data or control signaling to which the scheduling request relates is delay sensitive.

11. The method according to claim 8, in which the time to the periodic transmission opportunity is a time remaining until a next periodic transmission opportunity.

12. The method according to claim 8, in which the time to the periodic transmission opportunity is a scheduling request interval configured by the wireless network.

13. The method according to claim 8, in which the periodic transmission opportunity comprises a second periodic transmission opportunity, and the method comprises determining and selecting as said after attempting to transmit the uplink message on a radio resource corresponding to a previous first periodic transmission opportunity has failed.

14. The method according to claim 8, in which the method is executed by a user equipment and the method further comprises:
   for the case in which the random access procedure is selected, sending to the wireless network during the random access procedure an indication that the user equipment is not releasing radio resources allocated to the user equipment that are associated with periodic transmission opportunities.

15. A tangible non-transitory computer-readable medium bearing computer program code embodied therein for use with a computer, the computer program code comprising:
   code for determining that a time to a periodic transmission opportunity exceeds a threshold; and
   code for, in response to the determining, selecting between using a random access procedure and the periodic transmission opportunity to transmit an uplink message,
   in which the threshold is configured by a wireless network and the threshold is radio bearer specific.

16. The tangible non-transitory computer-readable medium according to claim 15, in which:

the periodic transmission opportunity comprises a scheduling request opportunity which is periodic according to an interval configured by the wireless network; and
the uplink message comprises a scheduling request.

* * * * *